Dec. 12, 1950     E. MOFFETT     2,533,495
FISHING LEADER DISPENSER
Filed March 21, 1949

INVENTOR.
Ewell Moffett
BY
Philip A. Friedin
Attorney

UNITED STATES PATENT OFFICE 2,533,495

FISHING LEADER DISPENSER

Ewell Moffett, Palmdale, Calif.

Application March 21, 1949, Serial No. 82,521

2 Claims. (Cl. 242—96)

This invention relates to improvements in means for packaging, carrying, and dispensing thread-like elements such as fishing leaders, yarn, thread, cord and similar materials, to keep the material clean, and to prevent snarling.

As is well known, fishing leaders are conventionally packaged in coils which are held together with no danger of snarling so long as the binding means is not removed, but once this binding means is removed, the utmost care must be exercised to prevent snarling.

With my invention, the leader when opened can be wound on the spool portion of the dispenser, the parts assembled, and any amount of leader can be removed at any time without any danger of snarling, as the terminal end is always gripped and held until some is to be dispensed, and the terminal end is always accessible. Furthermore, the leader, as well as other materials such as thread can be packaged and marketed in these dispensers, ready for use.

The objects and advantages of the invention are as follows:

First, to provide a dispenser for thread-like materials which dispenser will grip and maintain the terminal end accessible at all times.

Second, to provide a dispenser as outlined which requires only a slight movement to free the thread-like material for use, or to grip the terminal end of the material to prevent snarling.

Third, to provide a dispenser as outlined with pivot recesses for use of the finger and thumb as pivots for easy dispensing of the material.

Fourth, to provide a dispenser as outlined which is simple in construction and economical to manufacture, and which can be made in sizes to suit the diameter and length of the thread-like material to be packaged therein.

In describing the invention reference will be had to the accompanying drawings, in which.

Figure 2:
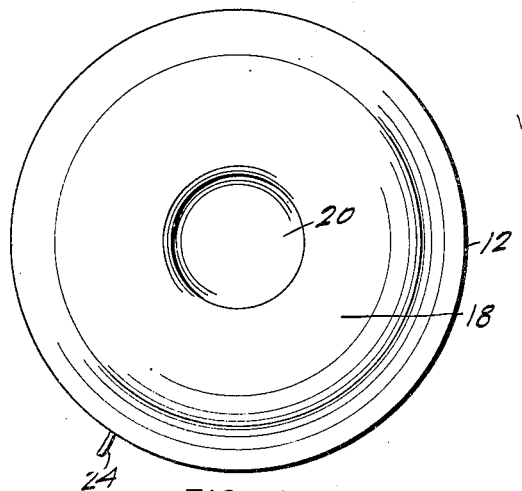
Fig. 2 is a side elevation of the invention.
Figure 1:
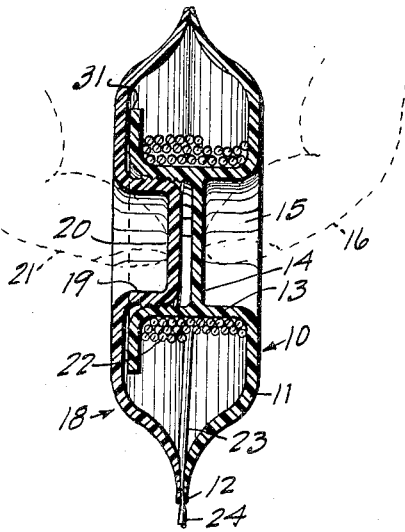
Fig. 1 is a vertical section through the invention showing a leader wound thereon with the terminal end gripped and accessible.

The invention consists of two members which assemble together after the material is wound in one member, and which members, by a simple relative movement will grip or release the terminal end of the material, one member 10 comprising a cover 11, peripheral gripping edge 12 with a spool or bobbin 13 formed axially thereof and projecting inwardly to a distance approximately equal to twice the depth of the cover from the gripping edge to the outside 11 of the cover, so that the gripping edge falls about midway of the length of the spool, the core of the spool being hollow on both sides of an intermediate wall 14, the recess 15 on the outside forming a pivot bearing for the thumb or finger 16, and the peripheral wall 17 of the recess on the opposite side of the intermediate wall being threaded internally as shown.

The other member 18 is similarly shaped to the member 10 except that instead of the inwardly projecting spool, a hollow hub 19 has a bottom wall 20 and is externally threaded to cooperate with the internal threads formed in the wall 17; the recess forming a pivot bearing for the finger or thumb 21.

To package the fishing leader or other thread-like material, the two parts 10 and 18 are disassembled, the leader is wound on the spool as indicated at 22 and the terminal end 23 is held while the member 18 is screwed into place until the peripheral gripping lip 12 grips the terminal end of the leader, a portion 24 of the terminal end projecting out from the lip for ready access.

For dispensing the leader, the two members 10 and 18 are relatively turned to just slightly ease the grip on the leader, the terminal end 24 is gripped between the thumb and finger of one hand and the finger and thumb of the other hand are inserted in the recesses 15 and 20 to function as pivots while the desired amount of leader is drawn out, after which the two members are again relatively turned in the opposite direction to grip the terminal end. The length of leader is then cut off, leaving a projecting portion for ready access. Thus the material packaged in this spool or bobbin is kept clean and free from any possibility of becoming snarled.

Figure 3:
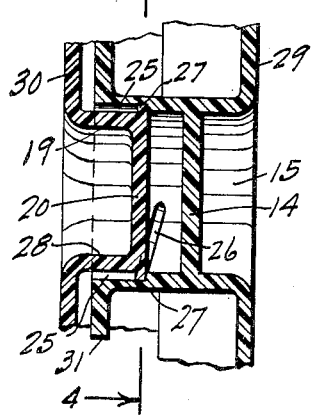
Fig. 3 illustrates a slightly enlarged fragmentary section through the invention showing a modification of the adjusting means.
Figure 4:
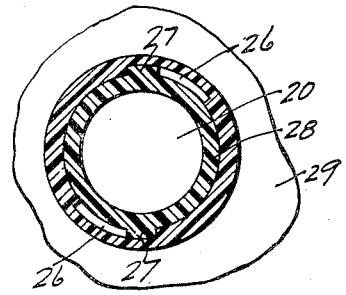
Fig. 4 is a section taken on line 4—4 of Fig. 3.
Figure 5:
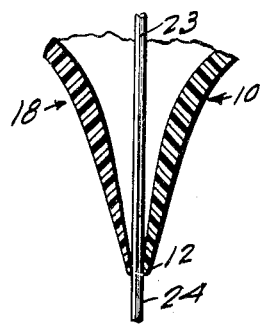
Fig. 5 is a greatly enlarged view of the gripping edge of the cover members showing a leader terminal gripped thereby.

Figs. 3 and 4 show a modification of the invention in which a bayonet type of securing means is provided and which consists of a keyway cut axially in the opposite walls of the spool hub and each terminating in an angular slot 26, and keys 27 are formed on the opposite sides of the hub 28, these keys sliding down the axial slots and upon relative rotation of the two members 29 and 30 causing the members to lock together and tighten to grip the terminal end 24.

Obviously, the flange 31 on the spool can be made separately if desired, for ease in casting, and securing to the hub by an adhesive, threading, or other suitable means, and though these devices can be formed of other materials, plastics appear to be the most desirable.

I claim:

1. A finishing leader dispenser comprising; a spool having a hollow core with intermediate diametric wall, and having a flange at one end and a cover member integral with the other end and functioning as the flange for the other end of the spool and having a circular peripheral gripping edge substantially in alignment with the longitudinal center of the spool with the cover member concavely formed; a second cover member similarly formed and having a hollow hub to fit in the hollow core and including adjusting means cooperative between the hollow core and said hub for relative axial adjustment between the two members to cause the gripping edges of the members to cooperate to grip the terminal end of thread-like material wound on said spool when adjusted in one direction, and to release said terminal end when the members are adjusted in the opposite direction.

2. A structure as defined in claim 1; said hollow hub having a bottom wall, and said hollow core with its intermediate wall and said hollow hub with its bottom wall functioning as pivot bearings for the thumb and finger of a hand for convenience in dispensing material from the spool.

EWELL MOFFETT.

REFERENCES CITED

The following references are of record in the file of this patent:

UNITED STATES PATENTS

| Number | Name | Date |
|---|---|---|
| 1,418,462 | Potstada | June 6, 1922 |
| 2,029,975 | Winchester | Feb. 4, 1936 |
| 2,463,009 | Woodland et al. | Mar. 1, 1942 |
| 2,438,805 | Hoyle | Mar. 30, 1948 |